(12) United States Patent
Helfrich et al.

(10) Patent No.: US 9,180,968 B2
(45) Date of Patent: Nov. 10, 2015

(54) PARTITION WALL FOR AN AEROPLANE CABIN, AND AN AEROPLANE

(75) Inventors: Felix Helfrich, Hamburg (DE); Holger Warner, York (DE)

(73) Assignee: Airbus Operations GmbH, Hamburg (DE)

(*) Notice: Subject to any disclaimer, the term of this patent is extended or adjusted under 35 U.S.C. 154(b) by 225 days.

(21) Appl. No.: 13/991,786

(22) PCT Filed: Dec. 14, 2011

(86) PCT No.: PCT/EP2011/072791
§ 371 (c)(1),
(2), (4) Date: Sep. 25, 2013

(87) PCT Pub. No.: WO2012/084651
PCT Pub. Date: Jun. 28, 2012

(65) Prior Publication Data
US 2014/0008491 A1  Jan. 9, 2014

Related U.S. Application Data

(60) Provisional application No. 61/426,528, filed on Dec. 23, 2010.

(30) Foreign Application Priority Data

Dec. 23, 2010  (DE) .......................... 10 2010 064 100

(51) Int. Cl.
*B64D 11/00*  (2006.01)

(52) U.S. Cl.
CPC ............. *B64D 11/0023* (2013.01); *Y02T 50/46* (2013.01)

(58) Field of Classification Search
CPC ........................... B64D 11/00; B64D 11/0023
See application file for complete search history.

(56) References Cited

U.S. PATENT DOCUMENTS

| | | | | |
|---|---|---|---|---|
| 1,783,703 A | * | 12/1930 | Crowell et al. | 312/199 |
| 2,396,039 A | * | 3/1946 | Graves et al. | 244/118.1 |
| 3,733,756 A | * | 5/1973 | Butler | 52/36.5 |
| 5,085,382 A | | 2/1992 | Finkenbeiner | |
| 5,816,534 A | * | 10/1998 | Schumacher | 244/119 |
| 6,056,377 A | * | 5/2000 | Jeter | 312/183 |
| 6,065,717 A | * | 5/2000 | Boock | 244/1 N |
| 6,073,399 A | * | 6/2000 | Shipman et al. | 52/36.1 |

(Continued)

FOREIGN PATENT DOCUMENTS

| CN | 100415603 | 9/2008 |
|---|---|---|
| DE | 3827279 | 2/1990 |

(Continued)

OTHER PUBLICATIONS

Chinese Office Action, Oct. 20, 2014.
International Search Report, Mar. 29, 2012.
German Office Action, Dec. 23, 2010.

*Primary Examiner* — Justin Benedik
(74) *Attorney, Agent, or Firm* — Greer, Burns & Crain ltd.

(57) ABSTRACT

A standardized/modularized partition wall with a basic sandwich structure for purposes of separating a cabin area of an aeroplane. The partition wall has a multiplicity of defined zones for the flexible positioning of holding fixtures for the connection of accessories such as flat screens, baby carriers, newspaper racks, and similar, and which is dimensioned for a maximum population with accessories.

11 Claims, 3 Drawing Sheets

(56) References Cited

U.S. PATENT DOCUMENTS

| | | | |
|---|---|---|---|
| 7,005,175 B2 * | 2/2006 | Hachenberg et al. | 428/75 |
| 2003/0222175 A1 * | 12/2003 | Movsesian et al. | 244/118.5 |
| 2005/0116102 A1 * | 6/2005 | Bouchet et al. | 244/118.5 |
| 2006/0145442 A1 | 7/2006 | Van Loon et al. | |
| 2007/0295862 A1 * | 12/2007 | Hupperich et al. | 244/118.5 |
| 2008/0263974 A1 | 10/2008 | Veckenstedt et al. | |
| 2009/0159747 A1 * | 6/2009 | Jorn | 244/119 |
| 2009/0200422 A1 * | 8/2009 | Johnson et al. | 244/118.5 |
| 2009/0224103 A1 * | 9/2009 | Neumann et al. | 244/131 |
| 2009/0242149 A1 | 10/2009 | Breuer et al. | |

FOREIGN PATENT DOCUMENTS

| | | |
|---|---|---|
| DE | 102007017853 | 10/2008 |
| DE | 102008016419 | 10/2009 |
| DE | 102009010861 | 10/2009 |
| EP | 0354403 | 2/1990 |
| EP | 0708018 | 4/1996 |
| FR | 2937006 | 4/2010 |
| WO | 2004071867 | 8/2004 |

* cited by examiner

1

PARTITION WALL FOR AN AEROPLANE CABIN, AND AN AEROPLANE

CROSS-REFERENCES TO RELATED APPLICATIONS

This application claims the benefit of the U.S. Provisional Application No. 61/426,528, filed on Dec. 23, 2010, and of the German patent application No. 10 2010 064 100.6 filed on Dec. 23, 2010, the entire disclosures of which are incorporated herein by way of reference.

BACKGROUND OF THE INVENTION

The invention concerns a partition wall for an aeroplane cabin and an aeroplane.

Partition walls make possible the subdivision of an aeroplane cabin into areas fitted out with different levels of comfort, such as e.g. first class and economy class. Partition walls of this kind are of known art from DE 10 2008 016 419 A1 or US 20090242149 A1, amongst others. As a rule the function of the partition walls, however, is not only in the separation of cabin areas, but also in the attachment of accessories, such as e.g. flat screens, newspaper racks and baby carriers. Since the position of the partition walls within the cabin as well as their extrinsic appearance is ultimately decided by the airlines, partition walls can in principle be installed in different positions in the cabin, with different geometric dimensions as a consequence. This results in a multiplicity of variants of embodiment, as a result of which automated production is almost impossible and the level of manual intervention in production is very high. At the same time the same technical requirements apply for all variants of embodiment. In addition to requirements with regard to e.g. behaviour in the event of fire, moisture absorption, or vibration resistance, only a certain level of deformation of the partition is acceptable, as conditioned by the occurrence of in-flight loads. Moreover, the basic demand for continuous reduction of fuel consumption has to be satisfied, so that the partition walls are only allowed to have minimal weight.

Partition walls of known art have a sandwich-type planar structure reinforced by means of stiffening profiles, which consists of a honeycomb core, and two cover layers on either side. However, in the event of fire the cover layers often have a tendency to detach from the honeycomb core. At the same time, however, the cover layers in particular have a great influence on the level of deformation, so that to prevent any detachment of the cover layers the latter can or may only have a certain maximum strength.

SUMMARY OF THE INVENTION

The object of the invention is to create a partition wall for the separation of cabin areas of an aeroplane, which removes the above-cited disadvantages and in the course of leaner production has the maximum possible flexibility with regard to accessories as well as an optimised planar structure, and to create an aeroplane whose partition walls enable a multiplicity of different configurations of accessories.

An inventive partition wall for the separation of cabin areas of an aeroplane has a sandwich-type planar structure, which in accordance with the invention has a multiplicity of defined zones for purposes of flexible positioning of holding fixtures to enable the connection of accessories such as, for example, flat screens, baby carriers and newspaper racks, wherein the planar structure is dimensioned for a maximum population with accessories.

The inventive solution allows a standardisation and/or modularization of the partition walls. An inventive partition wall makes possible, by virtue of the defined zones and the design for a maximum number of connections, coverage with different configurations of accessories. In the context of the invention accessories are to be understood to include not only flat screens, baby carriers, newspaper racks and similar, but also handles, information signs, monitoring cameras, emergency equipment packs, etc. The partition wall is based on a basic sandwich-type structure that remains the same for all configurations, with a multiplicity of zones, which makes possible the connection of accessories from all manufacturers, so that the partition wall is individualized only after its manufacture by the connection of the accessories. Since the structure remains the same any particular partition wall does not require any new analysis and this enables a lean and cost-effective design and in particular production. It can be manufactured cost-effectively in large numbers with a high level of automation. Since each partition is dimensioned for a maximum population with accessories, this ensures that the partition wall meets the prescribed technical requirements, independently of its population.

The zones can be designed on one side in the region of a front face or a rear face of the partition wall. To achieve maximum flexibility for the partition wall, however, it is advantageous if the zones are designed on both sides, that is to say, in the region of the front face and the rear face of the partition wall. This can be achieved, for example, if the zones extend through the partition wall.

In a preferred example of embodiment for connection purposes the zones are in each case individualized for a particular group of accessories. The zones can, for example, have a particular material structure and size. For example in the zones for the connection of flat screens the structural requirements will differ from those in the zones for the connection of newspaper racks. Thus by preparation of the zones for particular accessories the partition wall can be structurally optimised. Avoidable extra weight can thus be prevented. Likewise in some zones leads or cables for purposes of power supply and/or data supply for the connection of a flat screen, for example, can already be laid in position, as a result of which the installation of the corresponding accessories is simplified. Here, in the course of individualization, experience with regard to the positioning of different accessories can in particular be utilised.

For reasons of comfort, and in terms of ergonomics, it is advantageous if the zones of one group are arranged next to one another in the transverse direction. Thus in terms of ergonomics, for example, it is advantageous to arrange the flat screens at the eye level of seated passengers.

For reasons of comfort it is advantageous, for example, to arrange the newspaper racks at the knee height of seated passengers.

In one example of embodiment the zones of one group are spaced apart from one another, wherein the respective accessories can be connected across a plurality of zones. By this means the basic sandwich-type structure can extend between the zones and can frame these, thus aiding the stability of the partition wall. In combination with the option of connection across zones the flexibility is increased, since the positioning of particular accessories is not limited to only one zone.

Depending on the stiffness of the planar structure, the calculated loading, the material selected, etc., at least one stiffener with a hollow profile can be integrated into the planar structure for purposes of stiffening the partition wall. Exemplary profiles are tubes with a circular or a rectangular cross-section. By this means the at least one stiffener can also be deployed as a cable conduit, as a result of which the stiffener becomes multifunctional. The multifunctionality enables the omission of individually designed aluminium tubes, which previously have been deployed in partition walls, as a rule as cable conduits. By this means not only is design and production further simplified, but the weight of the partition wall is also further reduced. At the same time it is possible to reduce further the weight of the partition wall if the at least one stiffener is manufactured, at least in some sections, from a fibre-reinforced composite material, such as CFRP or GFRP, an aramide fibre-based or a natural fibre-based composite material, or a light metal alloy, such as magnesium.

In order to avoid any damage to the at least one stiffener during the insertion of the holding fixtures into the zones for purposes of connecting the accessories, the latter can extend alongside, or laterally between, the zones.

The protection of the cables from damage can be improved if the at least one stiffener is arranged with one section in the vicinity of a foot attachment section for purposes of attaching the partition wall to the floor, so that leads exiting from the cabin floor area can be introduced directly into the stiffener. Alternatively or additionally, however, the at least one stiffener can also be arranged in a head attachment section of the partition wall, so as to make an electrical connection into the ceiling also possible.

In order to achieve the maximum possible flexibility of the cable conduit arrangement with reference to the zones, it is advantageous if the at least one stiffener is open over part of its periphery or at its end in the region of the zones.

In one example of embodiment the planar structure has a core of at least one honeycomb sheet, the cells of which are open to at least one adjacent cell. As a result of the reciprocal opening up of the cells a ventilated planar structure is formed, which in the event of fire prevents the build-up of pressure in the cells that has occurred in the past. In this manner cover layers can be configured and optimised in a significantly better manner, leading to a significant saving in weight. Needless to say, however, the planar structure can also have a core of conventional honeycomb cells.

In one preferred example of embodiment the core consists of at least one sheet of folded cells, which has a multiplicity of ventilation passages open at least at one end. Sheets of this kind have a relatively high level of stability and in addition to pressure equalization the ventilation passages also enable reliable dehumidification, so that condensation water and similar cannot collect in the core, but instead is fed out of the partition wall. Moreover, it is possible to adjust the profile, number and flow cross-section of the ventilation passages in almost any suitable manner. The core can, however, also be a light metal foam with appropriately open pores. A foam core of this kind could have a stiffness such that the utilisation of a tube-type stiffener becomes superfluous.

In one variant the ventilation passages are open to a border region that has no edge protection. This allows conventional edge protection to be used. However, the edge protection can also be modified such that this has, at least in some sections, a structure in the form of a mesh or a perforated strip with a multiplicity of openings for purposes of ventilating the folded cell-type core. However, in this alternative variant the edge protection openings must be regularly checked for air permeability in order to avoid any blocking up of the same.

An aeroplane in accordance with the invention has a multiplicity of inventive partition walls. An aeroplane of this kind has in particular, maximum possible flexibility with regard to the positioning of accessories and a reduced level of effort associated with installation of the accessories, so that in an aeroplane of this kind customer requirements can be accommodated rapidly and simply.

Other advantageous examples of embodiment of the invention are the subject of further subsidiary claims.

BRIEF DESCRIPTION OF THE DRAWINGS

In what follows preferred examples of embodiment of the invention are elucidated in more detail with the aid of highly simplified schematic representations. Here.

DETAILED DESCRIPTION OF THE PREFERRED EMBODIMENTS

In the figures the same constructive elements have the same reference numbers, wherein in the interests of clarity only some of the elements are provided with a reference number in some of the figures.

Figure 1A:
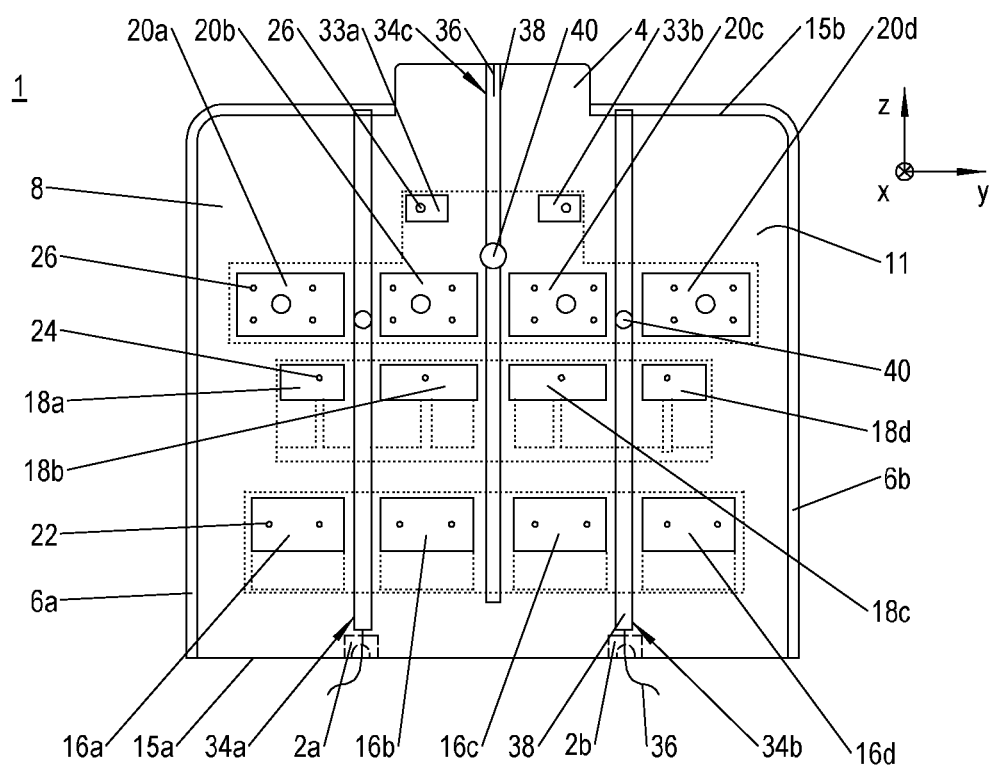
FIG. 1a shows an inventive partition wall with connection zones and stiffeners, as emphasised in the drawing.

FIG. 1a shows an inventive partition wall 1 for the separation of cabin areas in an aeroplane. It extends laterally from a cabin gangway, or between two cabin gangways, in the transverse direction y of the aeroplane, and forms two cabin areas arranged one behind another in the longitudinal direction x of the aeroplane. It has, for example, two foot attachment sections 2a, 2b for purposes of attachment to seating rails in the floor, and a head projection 4 for purposes of attachment to an aeroplane structural section in the ceiling. In order to prevent damage to the partition wall 1 in the border regions visible between the attachment sections 2a, 2b and the projection 4, these border regions are encompassed in each case by edge protection 6a, 6b.

Figure 1B:
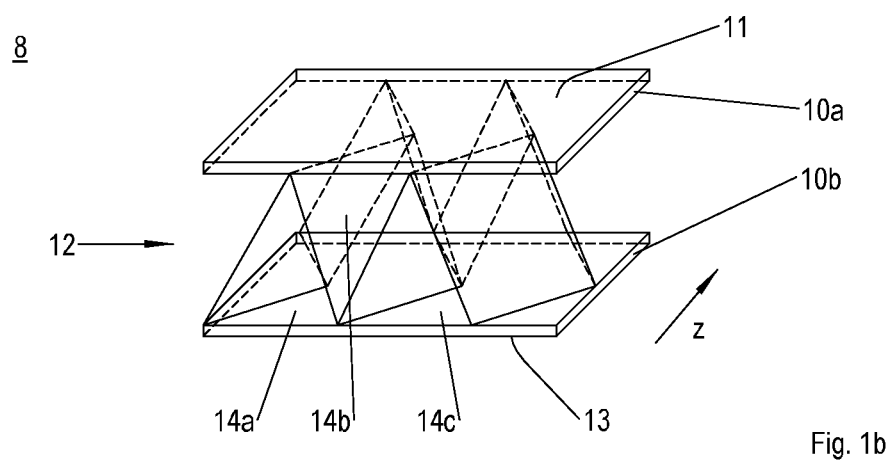
FIG. 1b shows an exemplary section through the partition wall.

In accordance with FIG. 1b the partition wall 1 has a ventilated sandwich-type planar structure 8 with two outer cover layers 10a, 10b, which form a front face 11 of the partition wall 1 and an opposing rear face 13 of the partition wall 1. Between the cover layers 10a, 10b, preferably manufactured from a carbon fibre-, glass fibre-, aramide fibre- or natural fibre-reinforced composite material is arranged a core 12 designed as a folded cell sheet. The core 12 has a multiplicity of cells 14a, 14b, 14c, which are designed, for example, as ventilation passages 14a, 14b, 14c running in a zigzag-shape next to one another in the vertical direction z. As a result of the exemplary profile in the vertical direction z the ventilation passages 14a, 14b, 14c extend from the foot border region 15a to the head border region 15b, wherein by virtue of the lack of edge protection 6a, 6b in the foot border region 15a they are open at one end, and in this manner a supply of air to or from the partition wall 1 can reliably take place. The ventilation passages 14a, 14b, 14c, which exit from the partition wall 1 in the region of the projection 4 are open at both of their ends (see FIG. 1a).

The planar structure 8 has a multiplicity of zones 16, i.e. 16a to 16d, 18, i.e. 18a to 18d, and 20, i.e. 20a to 20d, shown in FIG. 1a, in which holding fixtures 22, 24, 26, represented as circles, can be flexibly positioned for purposes of connecting the accessories shown in FIGS. 2 to 5, such as newspaper racks 28, baby carriers 30, flat screens 32, emergency equipment packs, handles, information signs, monitoring cameras and similar. In order to create the greatest possible flexibility with regard to the number of accessories 28, 30, 32 the planar structure 8 is designed for a maximum population with accessories 28, 30, 32.

The zones 18, 20, 22 preferably have a rectangular shape and preferably have a structure corresponding to that of the planar structure 8. However, they can also have another kind of structure. They are individualized for purposes of connection of a particular group of accessories 28, 30, 32 in each case, and among one another can thus also have other kinds of structures and/or can consist of other kinds of material. Their structure and their material are determined in particular by the maximum loads that must be accommodated as a result of the accessories 28, 30, 32, however lightweight structures are preferred, such as, for example, honeycomb structures, folded cell structures and foam structures and also lightweight materials such as, for example, fibre-reinforced composite materials, aluminium and magnesium. They extend through the partition wall 1 in the longitudinal direction x of the aeroplane and thus allow a connection of accessories 28, 30, 32 both in the region of the front face 11 and also in the region of the rear face 13.

In the examples of embodiment shown four zones 16a to 16d, 18a to 18d, 20a to 20d are provided in each case, spaced apart from one another, in lower, central and upper planes. As viewed in the vertical direction z of the aeroplane the lower zones 16a to 16d are provided for the accommodation of newspaper racks 28, the central zones 18a to 18d for the accommodation of baby carriers, and the upper zones 20a to 20d for the accommodation of flat screens 32. Thus the newspaper racks 28 are positioned at knee height, the baby carriers 30 at chest height, and the flat screens 32 at the eye level of seated passengers. For purposes of connection of, for example, flat screens 32 of a different size two additional zones 33, i.e. 33a, 33b are provided above the zones 16a, 16c of the upper plane. To make clear in the drawing the planar extent of the accessories 28, 30, 32 on the partition wall 1 the zones 16, 18, 20, 33 are individually or in combination surrounded by fields, which are formed from dotted lines, and symbolise the size of the accessories 28, 30, 32. For the optimal positioning of the respective accessories 28, 30, 32 on the partition wall 1 and relative to the passengers, the zones 16, 18, 20, 33 have areas of different sizes corresponding to the number of holding fixtures 22, 24, 26 necessary and/or provided.

The connection of the accessories 28, 30, 32 in the zones 16, 18, 20, 33 takes place via the holding fixtures 22, 24, 26, such as bushes, which can be flexibly positioned in the zones, and which, for example, are fixed in the zones 16, 18, 20, 33 by means of a filler material. In an exemplary manner the newspaper racks 28 and the baby carriers 30 are attached to two holding fixtures 22, 24 in each case and the flat screens 32 are attached to four holding fixtures 26 in each case. As can be seen in particular in FIGS. 2 to 5, connection of the accessories 28, 30, 32 can also take place over a plurality of zones 16, 18, 20, 33.

For purposes of stiffening the partition wall 1, i.e. the planar structure 8, two stiffeners 34a, 34b are integrated into the core 12, extending in the vertical direction z and running parallel to one another. The stiffeners 34a, 34b consist of a fibre-reinforced composite material such as, for example, CFRP or GFRP, and have a hollow, for example a tubular, profile. They run in the vertical direction z alongside, or between, the zones 16, 18, 20, 33, and extend over the whole height of the planar structure 8. In addition to their function of stiffening the partition wall 1 they also act as cable conduits for the accommodation of power and/or data leads 36, which, for example, are necessary for the operation of a flat screen 32. For this purpose they are provided with one end section 38 in each case, positioned in the region of the foot attachment sections 2a, 2b, and with at least one opening 40 over part of the periphery in each case in the region of the upper zones 20 for purposes of leading out the cables 36.

In addition a central tubular stiffener 34c is integrated into the core 12 in between the two lateral stiffeners, extending in the vertical direction z between the zones 16, 18, 20, 33 essentially over the full height of the partition wall 1. The central stiffener 34c has an end section 38 arranged in the projection 4 for the possible accommodation of power and/or data leads entering into the head of the partition wall 1, and in the region of the upper zones 20 is also provided with at least one opening 40 over part of the periphery for purposes of leading out the lines 36.

In what follows exemplary configurations, i.e. population variants, of the partition wall 1 with accessories are shown. Needless to say, a multiplicity of further configurations are also possible. Here the zones 16, 18, 20 and 33 and also the holding fixtures 22, 24, 26 are not represented in the interests of clarity.

Figure 2:
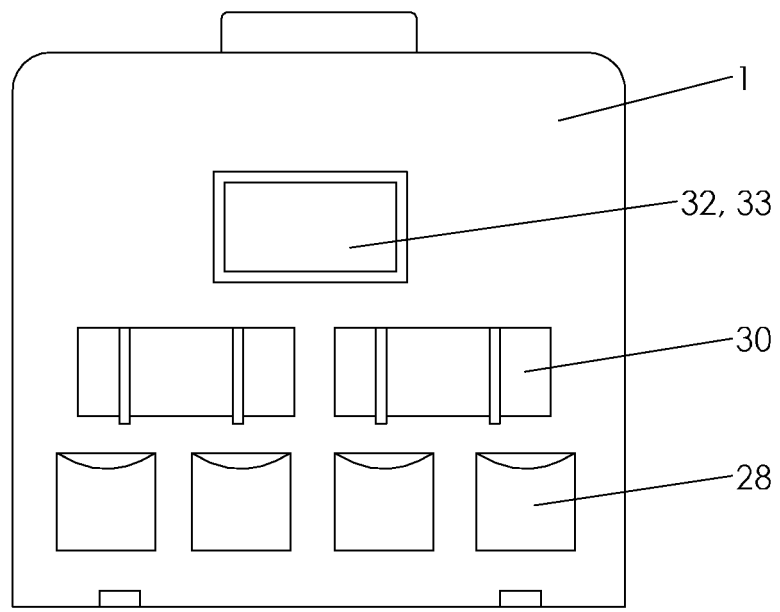
FIG. 2 shows a first variant of population of the partition wall with accessories.

FIG. 2 shows a first example of population of the partition wall 1. In accordance with this variant a newspaper rack 28 is connected via two holding fixtures 22 in each lower zone 16a to 16d. Two baby carriers 30 are connected in the central zones 18a to 18d, wherein these extend in each case across two zones 18a, 18b and 18c, 18d, and a holding fixture 24 is inserted in each of the zones 18. In the region of the upper zones 20b and 20c a large flat screen 32 is positioned in combination with the zones 33a and 33b.

Figure 3:
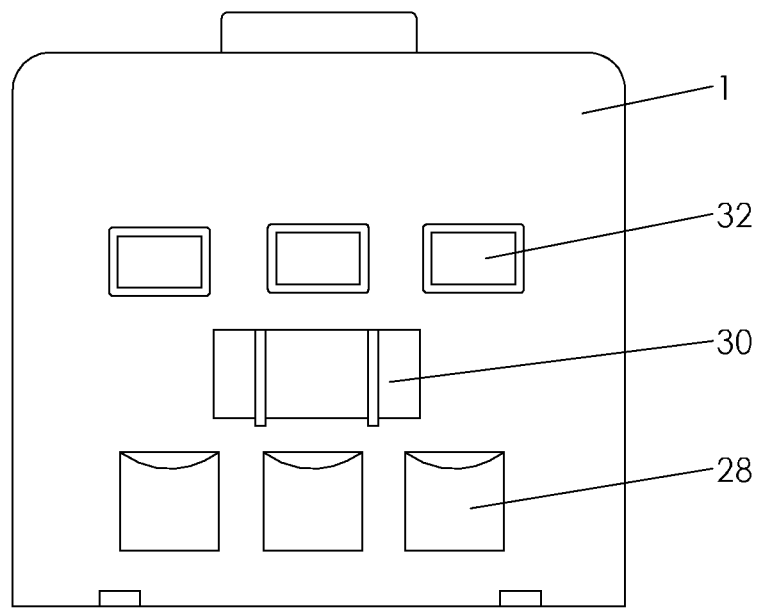
FIG. 3 shows a second variant of population of the partition wall with accessories.

FIG. 3 shows a second example of population of the partition wall 1. In this example just three newspaper racks 28 are provided in the region of the lower zones 16. Each newspaper rack 28 extends across two zones 16a, 16b and 16c, 16d, wherein a holding fixture 22 is inserted in each of the zones 16a to 16d. Just one baby carrier 30 is arranged in the region of the central zones 18 and this is connected across two zones 18b, 18c. Three small flat screens 32 are positioned in the region of the upper zones 20; in a manner corresponding to the newspaper racks 28, these extend across two zones 20a, 20b and 20c, 20d. In contrast to the connection of the newspaper racks 28, however, two holding fixtures 26 are inserted in each of the zones 20a to 20d, so that the flat screens 32 are in each case attached to four holding fixtures 26.

Figure 4:
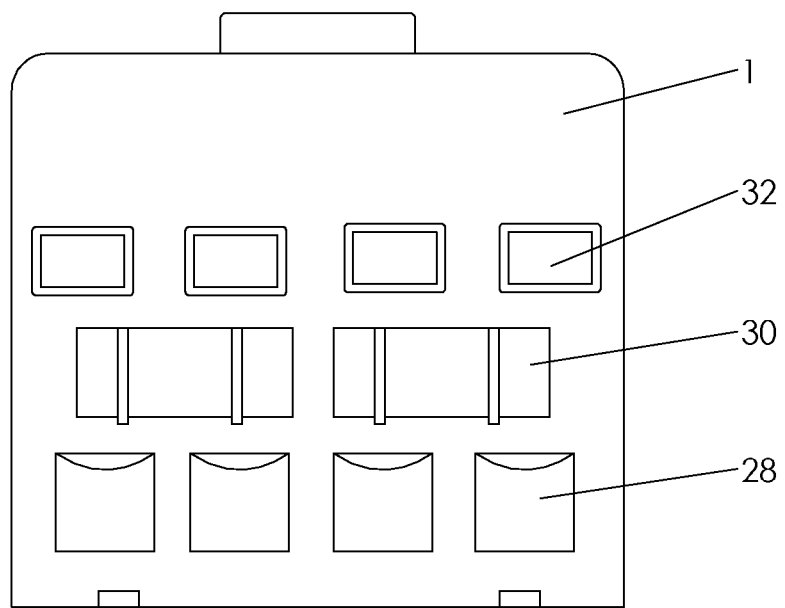
FIG. 4 shows a third variant of population of the partition wall with accessories.

FIG. 4 shows a third example of population of the partition wall 1. Here, in contrast to the example of population in FIG. 2, a small flat screen 32 is connected via four holding fixtures 26 in each of the upper zones 20a to 20d.

Figure 5:
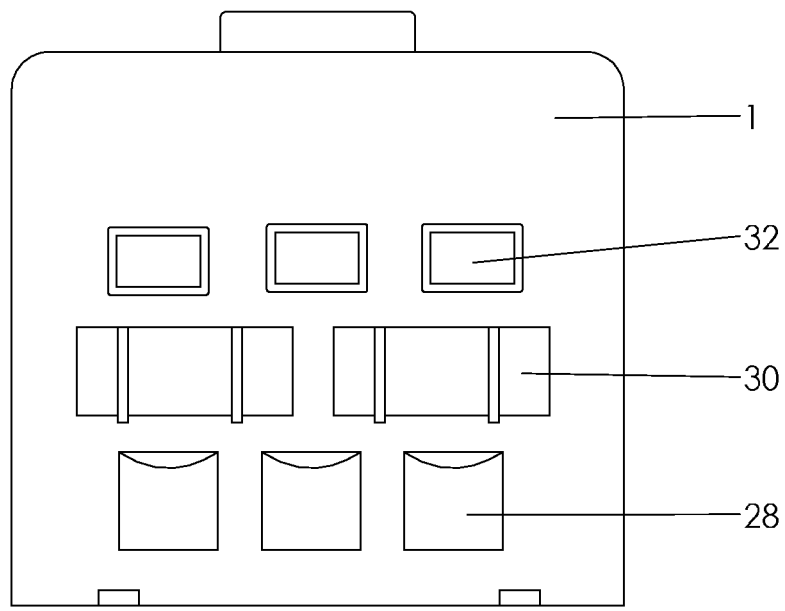
FIG. 5 shows a fourth variant of population of the partition wall with accessories.

FIG. 5 shows a fourth example of population of the partition wall 1, which in contrast to the second example of population in FIG. 3, and in an analogous manner to the first example of population in FIG. 2, is provided with two baby carriers 30 in the region of the central zones 18a, 18b and 18c, 18d.

Disclosed is a standardized/modularized partition wall with a basic sandwich structure for purposes of separating cabin area of an aeroplane; this has a multiplicity of defined zones for the flexible positioning of holding fixtures for the connection of accessories such as flat screens, baby carriers, newspaper racks, and similar, and which is dimensioned for a maximum population with accessories.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

1 Partition wall
2a, b Attachment section
4 Projection
6a, b Edge protection
8 Planar structure
10a, b Cover layer
11 Front face
12 Core
13 Rear face
14a, b, c Cells/ventilation passage
15a, 15b Border region
16, i.e. 16a, b, c, d Zone
18, i.e. 18a, b, c, d Zone
20, i.e. 20a, b, c, d Zone
22 Holding fixture
24 Holding fixture
26 Holding fixture
28 Newspaper rack
30 Baby carrier
32 Flat screen
i.e. 33a, 33b Zone
34a, b, c Stiffener
36 Cable
38 End section
40 Opening
y Transverse direction
x Longitudinal direction
z Vertical direction

The invention claimed is:

1. A partition wall configured to separate cabin areas of an aeroplane, wherein the partition wall has a sandwich-type planar structure, and wherein the partition wall comprises:
   a multiplicity of defined zones,
   holding fixtures selectively positioned in a desired configuration in each of the defined zones to connect accessories to the partition wall,
   the planar structure being dimensioned and provided with sufficient holding fixtures to allow for a maximum number of accessories to be connected for the dimension of the planar structure,
   wherein the planar structure has a core having at least one folded cell-type sheet with a multiplicity of ventilation passages, the ventilation passages being open at least at one end to an open border region of the partition wall.

2. The partition wall in accordance with claim 1, wherein said accessories comprise at least one from a group comprised of a TV monitor flat screen, a baby carrier and a newspaper rack.

3. The partition wall in accordance with claim 1, wherein the zones are arranged on both a front side and a back side of the partition wall.

4. The partition wall in accordance with claim 1, wherein the zones are individualized for purposes of connecting in each case a particular group of accessories.

5. The partition wall in accordance with claim 4, wherein the zones of one particular group are arranged next to one another in a transverse direction.

6. The partition wall in accordance with claim 5, wherein the zones of one particular group are spaced apart from one another and the respective accessories can be connected across a plurality of zones.

7. The partition wall in accordance with claim 1, wherein at least one stiffener with a hollow profile is integrated into the planar structure.

8. The partition wall in accordance with claim 7, wherein the stiffener extends alongside at least some zones.

9. The partition wall in accordance with claim 7, wherein the stiffener is arranged with a section in a region of a foot attachment section for purposes of attaching the planar structure to a floor.

10. The partition wall in accordance with claim 7, wherein the stiffener is open in a region of the zones.

11. An aeroplane with a multiplicity of partition walls configured to separate cabin areas of an aeroplane, wherein each partition wall has a sandwich-type planar structure, and wherein each partition wall comprises:
   a multiplicity of defined zones,
   holding fixtures selectively positioned in a desired configuration in each of the defined zones to connect accessories to the partition wall,
   the planar structure being dimensioned and provided with sufficient holding fixtures to allow for a maximum number of accessories to be connected for the dimension of the planar structure,
   wherein the planar structure has a core having at least one folded cell-type sheet with a multiplicity of ventilation passages, the ventilation passages being open at least at one end to an open border region of the partition wall.

* * * * *